United States Patent [19]

Junginger et al.

[11] Patent Number: 4,509,628
[45] Date of Patent: Apr. 9, 1985

[54] FREE-WHEELING CONTROL SYSTEM FOR A MOTOR VEHICLE

[75] Inventors: Erich Junginger; Norbert Rittsmannsberger, both of Stuttgart; Eberhard Schnaibel, Hemmingen, all of Fed. Rep. of Germany

[73] Assignee: Robert Bosch GmbH, Stuttgart, Fed. Rep. of Germany

[21] Appl. No.: 398,349

[22] Filed: Jul. 15, 1982

[30] Foreign Application Priority Data

Jul. 23, 1981 [DE] Fed. Rep. of Germany ....... 3130453

[51] Int. Cl.³ .............................................. B60K 41/28
[52] U.S. Cl. .............................. 192/0.094; 192/0.082
[58] Field of Search ................. 190/0.094, 0.082, 0.09, 190/0.055, 0.044, 0.042, 0.075, 0.076

[56] References Cited

U.S. PATENT DOCUMENTS 2,021,645 11/1935 Cotterman ........................ 192/0.055
4,084,672 4/1978 Avins ................................ 192/0.055
4,407,398 10/1983 Fiala ................................. 192/0.055

*Primary Examiner*—George H. Krizmanich
*Attorney, Agent, or Firm*—Frishauf, Holtz, Goodman & Woodward

[57] ABSTRACT

In a free-wheeling vehicle drive system in which the free-wheeling function is cut in and cut out entirely in response to normal driving operation of acceleration and deceleration, at least the signal corresponding to engine acceleration, which may be provided by the accelerator pedal, is subjected to delay before it may set a flipflop establishing the free-wheeling function. The braking signal, which may conveniently be derived from the brake-light switch, can likewise be advantageously delayed in its resetting of the flipflop in order that brief touching of the brakes should not disable free-wheeling. A more refined system which cuts in free-wheeling only after acceleration of the engine followed by the establishment of an idling condition of the engine can be used without the necessity of providing an overrunning clutch, since the control of a normal clutch connecting or separating engine and drive train can provide free-wheeling. The use of both slow-acting engagement of the clutch and an overriding fast-action engagement, and the taking account of engine speed, engine temperature, downward road slope and rapid changes of position of the accelerator pedal, can provide a sophisticated and nevertheless natural control of free-wheeling over a wide variety of driving conditions.

7 Claims, 8 Drawing Figures

FREE-WHEELING CONTROL SYSTEM FOR A MOTOR VEHICLE

This invention concerns a free-wheeling control system adapted for use by the driver of a motor vehicle in a natural way without requiring him to handle special controls or to sacrifice the opportunity to utilize the braking power of the engine at appropriate times.

It is known to provide a free-wheeling drive system controlled by the depression of the accelerator pedal and by the depression of the brake pedal of a vehicle. Such a system is described, for example, in U.S. Pat. No. 4,084,672. In that known system a mechanical linkage is provided with a rocker arm which can be swung into one or the other of its end positions respectively by pressing down hard on the accelerator pedal and doing the same with the brake pedal. According to the position taken by the rocker arm an overrunning "free-wheeling" clutch installed in the power train of the vehicle is either put into service or cut out by a suitable bridging clutch. A disadvantage of this known system is that the switching in of free-wheeling occurs strictly at every pressing down of the accelerator pedal so that a very high bunching of operations switching the free-wheeling in and out occurs in normal driving, with a considerable impairment of driving comfort.

THE INVENTION

It is an object of the present invention to provide a control system for free-wheeling in a motor vehicle which is operable eventually in response to actuation of the accelerator pedal or the brake pedal and which is nevertheless more sparing in its imposition of switch-in and switch-out commands for the free-wheeling feature.

Briefly, electrical signals responsive either to the gas pedal or the throttle valve position, on the one hand and either to the brake pedal, the brake light contact or the pressure in the braking system, on the other hand, are used to control the switch-in and switch-out of the free-wheeling feature, and an undesired frequency of switching in and out is reduced by having at least the switch-on signal delayed by subjecting the corresponding electrical signal to time-averaging, sometimes referred to as integration. A bistable device is provided in the system so that once free-wheeling has bee put into effect it remains in effect until a signal for taking it out of action is produced, and vice versa. The system of the invention has the advantage that a switching over from free-wheeling to fixed drive or vice versa occurs when the criteria, derived for the purpose from control signals, are present for a definite duration of time, thus limiting the use of free-wheeling to occasions when it is actually desired and economically sensible.

The invention is applicable both to free-wheeling by means of an overrunning clutch equipped with an ordinary clutch for bridging it and taking it out of action or for the use of free-wheeling by a coupling or clutch that when released simply separates the driving wheels mechanically from the engine, although in the latter case operation is practical only if free-wheeling is arranged to be initiated during an idling condition of the engine following a substantial acceleration imposed by the accelerator pedal or throttle valve. By the use of a simple coupling and uncoupling clutch, the mechanical portion of a free-wheeling drive becomes extremely simple, while the reliability of the drive system is assured by the features of the control system in accordance with the invention. Such clutches are already built into many vehicles and the invention permits reliable free-wheeling features to be provided without the addition of supplementary mechanical units and their control. The practice of the invention with existing vehicles is facilitated by the fact that the control signals may be provided from the position of normal engine and vehicle controls. A particularly convenient control is the existing electrical control signal of a fuel injection system, for example. For provision of the desired signal representing slowing down of the vehicle, the switching signal of the already present brake light switch can be used, or a brake pressure sensor followed by a comparator may be used. The latter alternative has the advantage that switching off of the free-wheeling feature can be limited to the cases in which the brake pedal is stepped on hard, so that a mere touching or "stroking" of the brake pedal does not lead to switching out the free-wheeling feature. The elimination of free-wheeling is then reserved for those occasions where the braking power of the motor is actually desired.

As already mentioned the invention offers several modes of driving with a free-wheeling feature, first a mode in which free-wheeling is made available from the time the accelerator pedal is depressed until the brake is next actuated and, secondly, a mode in which free-wheeling is made available only after the driver eases up on the accelerator pedal and lets the engine go into idling condition, in which case the free-wheeling may be stopped either by putting on the brake or by reaccelerating. The particular kind of free-wheeling feature depends upon the type of vehicle and its propulsion equipment. Modifications are, furthermore, possible, for example for blocking the free-wheeling feature when the vehicle is proceding down a slope exceeding a certain inclination, so as to assure the availability of the braking effect of the motor in such situations. Another modification consists in blocking the provision of free-wheeling after a cold start until a certain motor temperature has been reached, since with a cold motor the use of engine-braking even when not necessary for driving purposes, reduces the warm-up time of the motor.

A particularly favorable effect can furthermore be provided with simple construction of a system according to the invention involving control of free-wheeling solely by the actuation of the accelerator pedal. In this case the availability of free-wheeling can conveniently be determined when an idling condition or a near idling condition is reached after a substantial acceleration or start-up and the termination of free-wheeling availability can be produced when the accelerator pedal is quickly made or allowed to come back from an idling position.

In such case control of the availability of free-wheeling can be done to suit the desired driving behavior of the vehicle with a single control signal provided by simple means.

Since in the manner of operation just described a signal can be provided that corresponds to the rate of displacement of the accelerator pedal, this signal can also be utilized to indicate a rearward rapid displacement of the pedal for signaling a desired mode of sport driving. This signal can be utilized to prevent a switching in of free-wheeling, preferably, when the accelerator pedal is, at intervals quickly pushed down. In this manner a fitting of the switching in of free-wheeling to a desired sport driving mode can be obtained.

Since the switching out of free-wheeling corresponds to making motor braking effects available again, it is provided in a further development of the invention to improve driving comfort by having the switching out of free-wheeling take effect slowly by use of a friction coupling. In order to prevent, on the other hand, that during this slow coupling procedure the vehicle engine should race as the result of the accelerator pedal being pressed far down, a recognition circuit is provided that activates a quick switchover control when the accelerator pedal is rapidly depressed, this quick-acting control then overriding the slowly operating friction coupling for deactivating free-wheeling.

Finally, in a further development of the invention free-wheeling control is combined with a thrust switch-off device that becomes effective if the free-wheeling is switched out, the accelerator pedal is in its zero or idling position and the motor speed exceeds a prescribed number of r.p.m. By combination of free-wheeling control with this shut-off device, a further substantial fuel saving becomes possible.

THE DRAWING

The invention is further described by way of illustrative example with reference to the annexed drawings, in which.

DESCRIPTION OF THE ILLUSTRATED EMBODIMENTS

Figure 1:
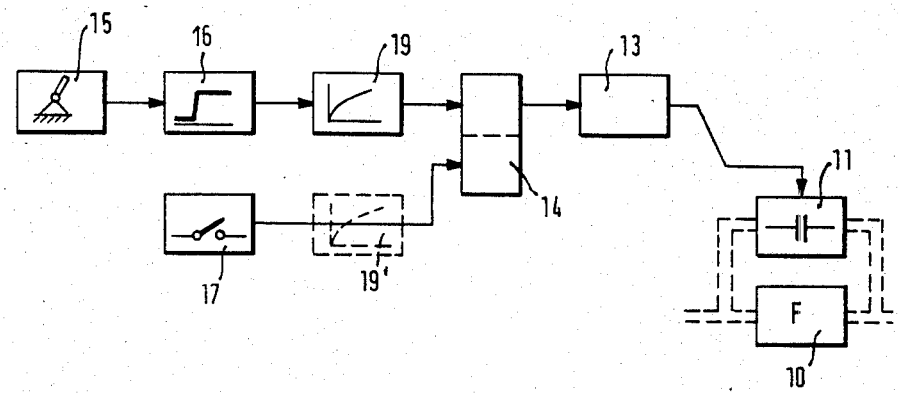
FIG. 1 is a circuit block diagram for a first embodiment of a motor vehicle free-wheeling control system according to the invention.
Figure 2:
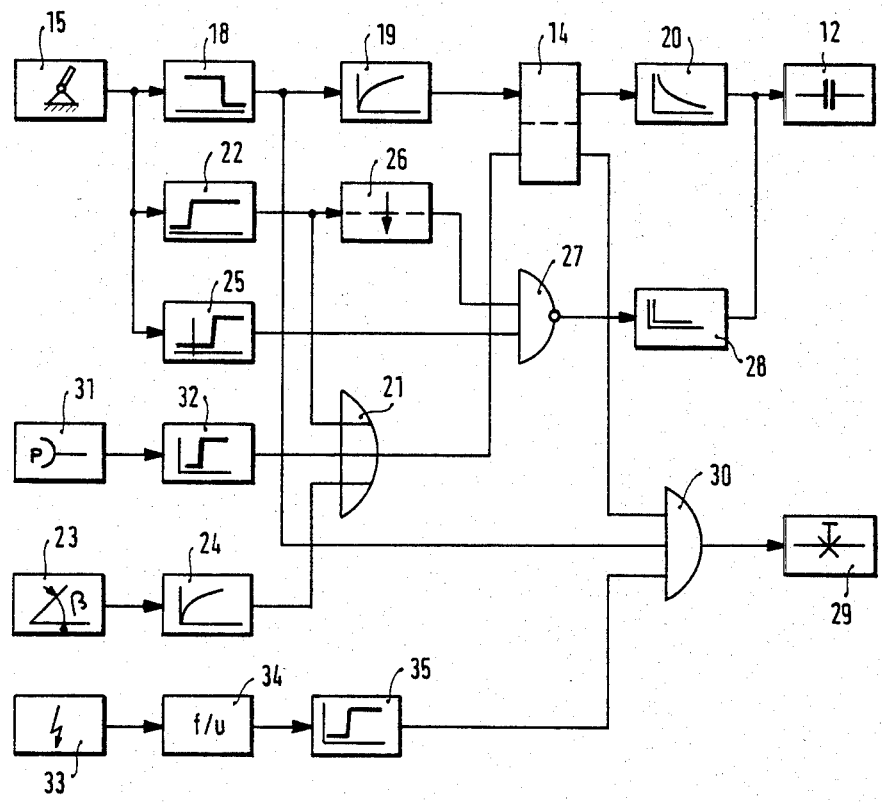
FIG. 2 is a circuit block diagram of a second embodiment of a motor vehicle free-wheeling control system according to the invention.
Figure 5:
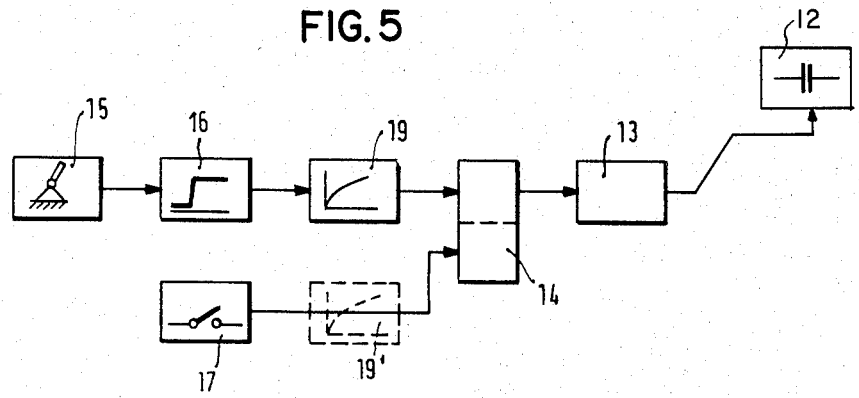
FIG. 5 is a circuit block diagram of a modification of FIG. 1.
Figure 6:
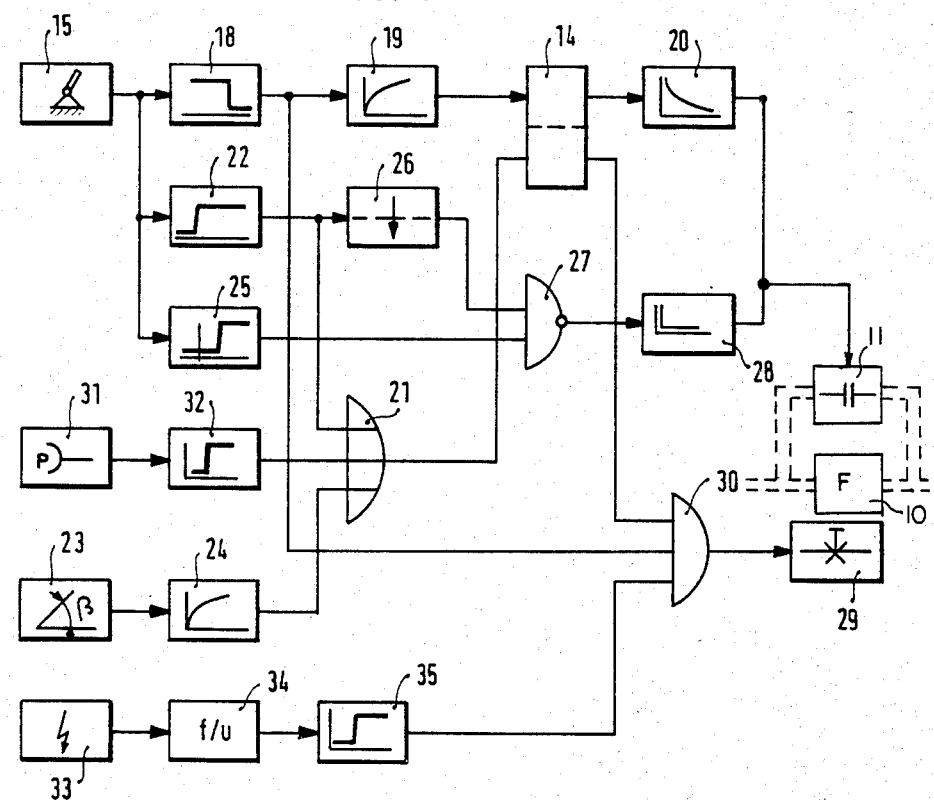
FIG. 6 is a circuit block diagram of a modification of FIG. 2.

At the right of FIG. 1, the line proceeding diagonally to the right and downwards from the block 13 designates a mechanical for a clutch 11 that serves as a bridging coupling for dispensing with the function of a free-wheeling coupling 10 of the conventional overrunning clutch kind. FIG. 5 show a similar system for operating a normal clutch 12 located in a vehicle transmission or built close to the engine flywheel, in a known way, for separating the motor from the drive to the wheels when a rigid coupling of motor to the wheels through a transmission is not desired. As a matter of fact, the system of FIG. 2 is more suitable for controlling such a motor-uncoupling clutch 12 than is the case with the system of FIG. 1. A modification of FIG. 2 in which a clutch 11 is controlled which bridges a free wheeling coupling 10 (automatic overrunning clutch) is shown in FIG. 6.

The fully uncoupling overrunning clutch 12 of FIGS. 2 and 5 does not need to be a supplementary element provided in the vehicle for a free-wheeling system of the invention. It may be a component normally provided in a vehicle transmission, or it may be the clutch of a normal manual stepwise gearshift. In the case of an automatic transmission, brake bands and/or couplings of an automatic gearshift transmission can be suitable controlled in a corresponding way.

In the following description, switching in of the free-wheeling feature means activating the free-wheeling feature, i.e., by opening the coupling 11 or the coupling 12. By switching out of free-wheeling is meant the operation of closing the coupling 11 or the coupling 12, so as to produce a stiff connection between the engine and the power train that drives the wheels, thus making possible the provision of a braking action by the motor on the wheels.

The positioning control member 13 of FIG. 1 is controlled by a signal storage unit 14 that can be provided in the form of a flipflop circuit. For setting the store 14, a signal derived from a desired degree of vehicle acceleration is used, shown in the embodiment illustrated in FIG. 1 as a signal corresponding to the depression of an accelerator pedal 15 out of its rest position. The signal provided by the accelerator pedal 15 is processed by a first threshold value stage 16 and then by an integrating circuit 19 that produces a delay before the signal reaches a magnitude sufficient to set the store 14 through its setting input. For resetting of the store 14, a signal is utilized that is derived from a desired degree of vehicle deceleration, in the illustrated example, a signal from the brake light switch 17 of the vehicle. As will be presently explained, other signals representative of the occurrence of acceleration or deceleration, as the case may be, can be utilized, as for example a signal from the throttle valve or a control signal of a fuel injection system for representing acceleration and, on the other hand, a signal from a pressure switch in the brake system for representing vehicle deceleration.

The characteristic of the first threshold stage 16 is so designed that a positive signal is produced when the acceleration pedal 15 is moved out of the idling position. In response to that action, the store 14 is set and the clutch 11 is opened, so that the free-wheeling feature is activated. According to the invention, the integrating delay circuit 19 is provided between the first threshold stage 16 and the store 14 to which there corresponds, in the embodiment shown, an integrating delay circuit 19′ in the resetting circuit of the store 14 following the brake light switch 17. The delay 19′ is however optional and is provided as may be required or desired in a particular case. The delay units 19 and 19′ have the effect that a transient occurrence of setting or resetting signals from the pedals do not lead to bringing in the free-wheeling function and, instead, for example, free-wheeling is made available only after the acceleration pedal 15 has been put in a depressed position for a substantial period of time, for example one to three seconds.

The embodiment illustrated in FIG. 1, as will now readily be seen, has the effect that free-wheeling remains operative in normal driving of the motor vehicle, which is to say when the accelerator pedal is pressed to some extent out of its rest position. The free-wheeling function can be cut out, on the other hand, by engagement of the clutch 11, only when the brake is actuated, while after release of the brake and subsequent pressing of the accelerator free-wheeling is again enabled after a few seconds at most.

In FIG. 2, there is illustrated a system in which, an engine coupling or separating clutch 12. Instead of being actuated by the positioning member 13, of FIG. 1 is operated by a slow-acting positioning member 20 that operates by closing the clutch 11,12 with a continuous slow transition movement, so that the restoration of the rigid two-way power connection between engine and driving wheels is established by a soft or smooth transition. Instead of the first threshold stage 16, there is provided in this case a second threshold stage 18 in the setting circuit of the store 14 that has a characteristic that is the inverse of the threshold stage 16, i.e., a positive output signal appears in the second threshold circuit 18 whenever the accelerator pedal 15 is *released*. The resetting of the store 14 is produced in the example of FIG. 2 through an OR-gate 21 having three inputs. The first input is connected to the output of a third threshold stage 22 which is connected to the accelerator pedal 15 and has a characteristic corresponding to that of the first threshold stage 16 of FIG. 1. The second input of the OR-gate is connected to the output of a brake pressure sensor 30 through a fifth threshold stage 32, while the third input of the OR-gate is connected to a clinometer 23 for the downward grade of the vehicle's road of travel, the connection being made through an integrating delay circuit 24.

The fourth threshold stage 25 is operatively connected to the accelerator pedal 15 and leads to one input of a NAND-gate 27, to the other input of which the output of the third threshold stage 22 is connected through a delay circuit 26 of the timing pulse type. The output of the NAND-gate 26 controls a rapid action actuator 28 for engaging the clutch 12, the rapid action actuator 28 being operated in parallel to the slow-actuating member 20.

Finally, a thrust cut-off device 29 is also provided which is controlled by an AND-gate 30 having three inputs. The device 29 may, for example, be a device that cuts off the supply of fuel to the engine, for example. The first input of the AND-gate 30 is connected to the complementary output of the store 14, its second input is connected to the second threshold circuit 18 and the third input is connected to a sixth threshold circuit 35 which responds to the output of a frequency-to-voltage converter 34, of which the input is provided by the ignition system 32.

The manner of operation of the system shown in FIG. 2 will now be described.

In contrast to the free-wheeling control system of FIG. 1, in FIG. 2 the store 14 is set, and thereby cuts free-wheeling in, only when the accelerator pedal is in the idling position (threshold stage 18) resetting of the store 14 and, consequently, a gradual cutting out of free-wheeling by closing the clutch 12 (slow-acting actuator 20) is produced when the accelerator pedal is depressed (third threshold stage 22), when the brake pressure exceeds a predetermined value (brake pressure sensor 31 with fifth threshold stage 32) or when the downward hill grade of the road exceeds, in a time average, a prescribed value (clinometer 23 with integrating delay circuit 24). In order to prevent racing of the engine when free-wheeling is cut out slowly, as soon as the accelerator pedal 15 is pressed down hard an overriding reset signal for operating the rapid engagement of the clutch 11,12 is generated through the NAND-gate 27 for the quick action actuator 28 whenever the accelerator pedal 15 is quickly pressed down, i.e., when the rate of positive accelerator pedal displacement exceeds a predetermined value in a predetermined time interval. This characteristic operation is assured by the threshold stages 22,24 and 25 in connection with the timing circuit 26. As soon as the accelerator pedal 15 is moved out of its rest position, the threshold stage 22 responds and sets the timing circuit 26, causing a positive signal to appear at its output for a definite short time. If before the lapse of this time interval an accelerator pedal position which is in effect specified by the fourth threshold stage 25 is reached, the NAND-gate 27 responds and produces an actuation signal at its output for the rapid action actuator 28.

Figure 4:
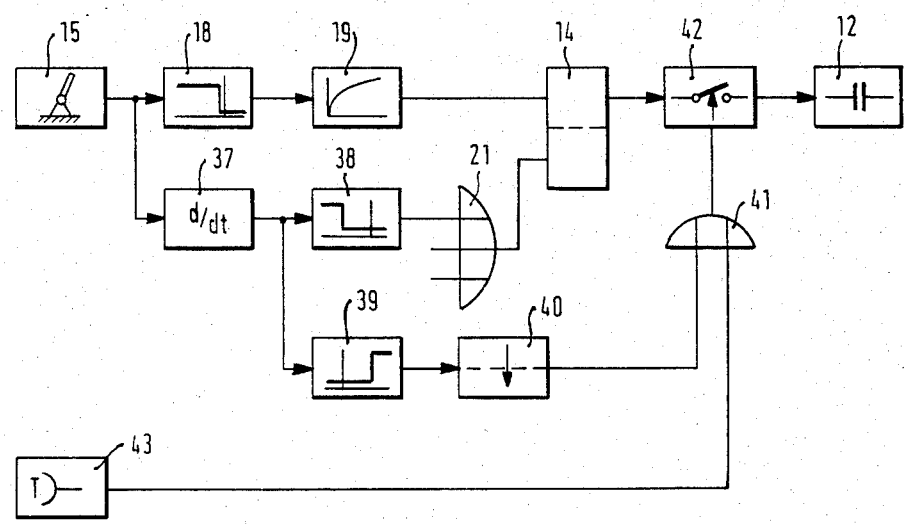
FIG. 4 is a circuit block diagram of the major part of a third embodiment of the system according to the invention.

It is evident that instead of the stages 22,25 and 26, a differentiating stage followed by a threshold stage can be used, as is illustrated for this case in FIG. 4. Conversely, in a system according to FIG. 4, it would be possible to utilize the corresponding elements just mentioned in FIG. 2 instead of those shown there. It is also illustrated in different embodiment for recognizing a desired extent of the vehicle deceleration (17 in FIG. 1; 31,32 in FIG. 2) can likewise be substituted for each other. The thrust shutdown device 29 illustrated in FIG. 2, which can be correspondingly used in the system of FIG. 1, produces interruption of the fuel supply to the engine (entirely or to certain cylinders according to the design of the engine) in particular conditions of driving which are recognized by the AND-gate 30. This interruption of the fuel supply is put into effect when free-wheeling is not operative (complementary output of the store 14), and at the same time the accelerator pedal 15 is in the idling position (second threshold stage 18) and also the motor speed exceeds a specified value, the latter condition being indicated, in the illustrated example, by a signal generated in the ignition system 32 in the form of a frequency, which is then converted into a voltage in the converter 34 to provide a signal to which the sixth threshold stage 35 responds when the signal reaches or exceeds the specified value.

Figure 3:
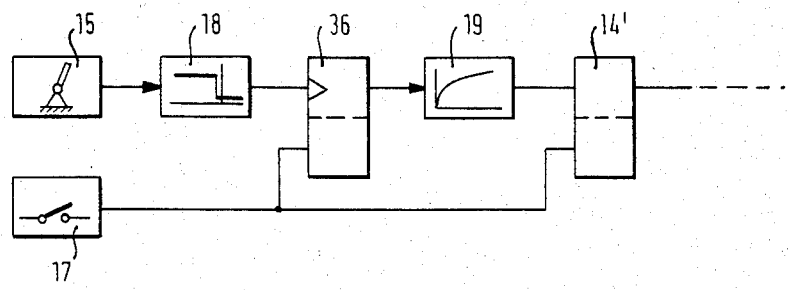
FIG. 3 is a circuit block diagram of a modification of the system of FIG. 2.

A modification of the manner in which the store 14 is controlled in FIG. 2 is illustrated in FIG. 3. In this modification, an additional store 36 is provided in the setting circuit of the store 14. This additional store 36 is, like the store 14, constituted as a flipflop, but in this case is set input operates dynamically rather than staticlally, i.e., the store 36 can be set only when a rising flank of a signal appears at its set input. The reset input of the store 36 is connected in parallel with the reset input of the store 14 and, accordingly, connnected through the brake light switch 17.

The interposition of the store 36 in the circuit has the effect that after release of the brake and opening of the brake light switch 17, free-wheeling is not immediately made available. In the system according to FIG. 2, whenever the accelerator pedal 15 is in its released condition, a positive signal will always remain at the set input of the store 14. By the interposition of the store 36 with a dynamic set input, the store 36 must be newly set in order to set the store 14 after it has been reset. Because of the dynamic nature of the set input, that is possible only when the accelerator pedal 15 is again depressed and then allowed to go back into the idling position. In this manner, it is assured that, for example in down-hill travel with brief actuation of the brake, the engine-braking effect will be retained after th brake is released, while the accelerator pedal is continuously left in the idling position.

Still another embodiment of a system according to the invention is illustrated in FIG. 4. This embodiment differs from the system according to FIG. 2 by the provision of a differentiating stage 37, followed by a seventh threshold circuit 38, in the resetting path for the store 14 that is provided between the accelerator pedal 15 and the reset input of the store. The output of the differenting stage 37 is, furthermore, connected to an eighth threshold stage 39 which responds by providing a signal to a retriggerable monoflop circuit 40, the output of which is provided to one input of an OR-gate 41 that has its other input connected to a motor temperature sensor 43. The OR-gate 41 operates an interruptor switch 42 interposed in the control line between the store 14 and the clutch 11,12 by which the free-wheeling condition is established or disabled. The manner of operation of the system illustrated in FIG. 4 will now be described.

During the setting of the store 14 which takes place in the manner described in connection with the embodiment shown in FIG. 2, there remains the possibility in the embodiment according to FIG. 4 for controlling the resetting of the store 14 exclusively by means of the accelerator pedal 15, while preserving also the other resetting possibilities illustrated in FIG. 2, these being alternatives also available through the OR-gate 21. The circuit of FIG. 4 makes it possible to recognize when the accelerator pedal 15 is released in a jerky fashion. This is done by the differentiating stage 37 and the seventh threshold stage 38, the latter providing a positive output signal when a specified negative threshold valve is understepped. When the negative accelerator pedal displacement rate is more negative than the negative threshold value at which the seventh threshold circuit 38 responds, the store 14 is reset through the OR-gate 21 and free-wheeling is terminated. This jerky withdrawal of the accelerator pedal 15 corresponds, of course, to the driver's desire for a deceleration of the vehicle.

Furthermore, the possibility of a desired sports driving style can be taken into account with the provision that in such a case the normal activation of free-wheeling may be suppressed. For this purpose, a signal is produced in the eighth threshold stage 39 in response to a jerky pressing down of the accelerator pedal 15. The output signal of this eighth threshold stage sets the retriggerable monoflop 40, which then remains set so long as an output signal of the eighth threshold stage 39 appears during its on-time. Therefore, if the accelerator pedal 15 is continually reactuated quickly ("jazzed"), a signal can be kept showing at the output of the monoflop 40 for continuing to suppress release of the clutch 12 that would allow free-wheeling to become available, that being done by keeping the interruptor contact 42 open in response to a signal through the OR-gate 41. The same function can be produced by a motor temperature sensor 43 that suppresses the activation of free-wheeling so long as the motor temperature remains below a specified value. In this manner, the result is obtained that when the motor is cold, the rigid connection between engine and wheel drive is maintained long enough to allow the motor to reach its operating temperature.

FIG. 5 shows a system like FIG. 1 in which a controlled clutch 12 with built-in free-wheeling is used instead of the clutch 11 that bridges the free-wheeling coupling 10. FIG. 6 shows the system like FIG. 2, in which the unit 20 and 28 operate a clutch 11 which bridges an overrunning clutch 10 instead of operating a unitary clutch 12 that has free-wheeling built in.

Figure 7:
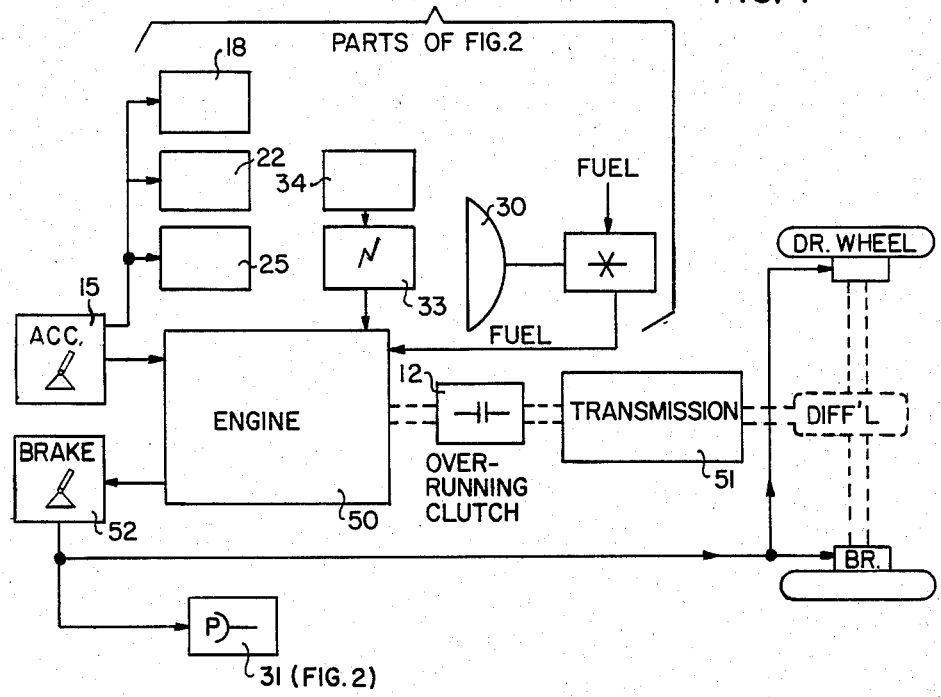
FIG. 7 is a schematic diagram of a portion of a vehicle equipped with the system of FIG. 2.

FIG. 7 is a diagram showing main parts of a vehicle but with the system of FIG. 2, limited to those parts of the vehicle and of the system of FIG. 2 that are linked together. The engine 50 and the transmission 51 are shown on opposite side of the overrunning clutch 12 which can be locked as in the case of the clutch 12 of FIGS. 2 and 5. A pedalactuated hydraulic brake 52 powered by the engine is shown in which the pressure applied to the brakes is also applied to the unit 31 of FIG. 2.

Figure 8:
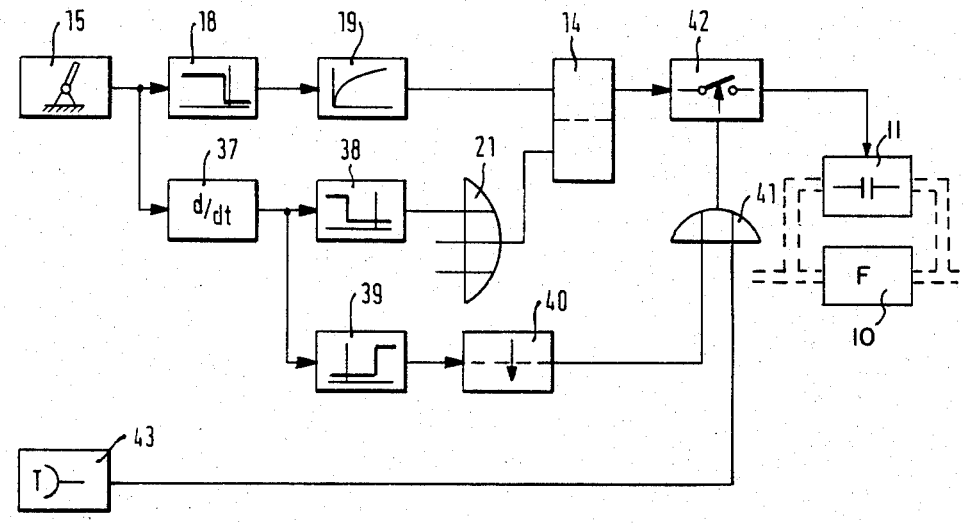
FIG. 8 is a circuit block diagram of a modification of FIG. 4.

FIG. 8 shows a system of FIG. 4 operating the separate clutch 11 that bridges the overrunning clutch 10 instead of controlling a clutch 12 having a built-in free-wheeling feature.

Although the invention has been described with reference to particular illustrative embodiments, it will be understood that still other modifications and variations may be possible within the inventive concept.

We claim:

1. Free-wheeling control system for a motor vehicle having an engine, a drive train, driving wheels, brakes, an accelerator pedal and a brake pedal and having interposed, in its power train between the engine and the driving wheels of the vehicle, overrunning clutch means (10,12) for free-wheeling one-way transmission of rotary power from the engine to the drive wheels and controllable clutch means (11, 12) which is disengageable to permit free wheeling and engageable to assure transmission of rotary power between the drive wheels and the engine in either direction, said sytem comprising:

means for producing a first signal corresponding to a change of engine operation away from an idling operation;

means for producing a second signal corresponding to the onset of operation of the brakes in response to said brake pedal;

means for producing a third signal corresponding to the existence of an idling operation of said engine;

means for engaging said controllable clutch in response to said first signal to a change of engine operation away from an idling operation and for engaging said controllable clutch means in response to said second signal;

means for releasing said controllable clutch means in response to appearance of a third signal representative of the existence of an idling operation of said engine, means for averaging said third signal for delaying the release of said clutch with respect to the beginning of idling operation of said engine, and means (14) for keeping said controllable clutch means engaged after a completed operation of said engaging means until operation of said releasing means and for keeping said controllable clutch released after a completed operation of said releasing means until an operation of said engaging means.

2. System as defined in claim 1 in which said engaging means operate through a positioning member (20) having a delaying characteristic for providing gradual and smooth engagement of said controllable clutch means and in which system there are also provided quick engagement means (28) for said controllable clutch means for overriding said positioning member (20) whenever the first time derivative of said first signal exceeds a predetermined value and likewise whenever the engine r.p.m. exceeds a predetermined value.

3. A system as defined in claim 1, in which overrunning clutch means (10) is interposed in said power train for providing free-wheeling when said controllable clutch means (11) is disengaged and said controllable clutch means (11) comprises a clutch which mechanically bridges said overrunning clutch means (10).

4. A system as defined in claim 1, in which said means for producing said second signal includes a brake pressure sensor (31) and means for deriving said second signal therefrom.

5. A system as defined in claim 4, in which a threshold switch (32) is interposed between the output of said brake pressure sensor (31) and said means for deriving said second signal from said output.

6. A system as defined in claim 1, in which said means for releasing said controllable clutch means in response to said third signal is constituted so as to release said controllable clutch means when said first signal reaches a value in the neighborhood of zero.

7. A system as defined in claim 1, in which said means for releasing said controllable clutch means in response to said third signal is constituted so as to release said controllable clutch means when said first signal is of zero value.

* * * * *